United States Patent
Sum et al.

(10) Patent No.: US 9,953,169 B2
(45) Date of Patent: Apr. 24, 2018

(54) MODIFY EXECUTION OF APPLICATION UNDER TEST SO USER IS POWER USER

(71) Applicant: ENTIT Software LLC, Sunnyvale, CA (US)

(72) Inventors: Sam Ng Ming Sum, Hong Kong (HK); Matias Madou, Diegem (BE)

(73) Assignee: Entit Software LLC, Sunnyvale, CA (US)

( * ) Notice: Subject to any disclaimer, the term of this patent is extended or adjusted under 35 U.S.C. 154(b) by 0 days.

(21) Appl. No.: 13/780,662

(22) Filed: Feb. 28, 2013

(65) Prior Publication Data

US 2014/0245460 A1    Aug. 28, 2014

(51) Int. Cl.
*G06F 21/57*    (2013.01)
*G06F 11/36*    (2006.01)

(52) U.S. Cl.
CPC ........ *G06F 21/577* (2013.01); *G06F 11/3644* (2013.01); *G06F 11/3676* (2013.01); *G06F 2221/033* (2013.01); *G06F 2221/2113* (2013.01)

(58) Field of Classification Search
CPC .... G06F 21/31; G06F 17/30861; G06F 21/30; G06F 11/3676; G06F 2221/2113; G06F 21/577
USPC .......................................... 726/2, 21, 26–28
See application file for complete search history.

(56) References Cited

U.S. PATENT DOCUMENTS

| | | | |
|---|---|---|---|
| 6,311,278 B1 | 10/2001 | Raanan et al. | |
| 6,584,569 B2 | 6/2003 | Reshef et al. | |
| 6,826,716 B2* | 11/2004 | Mason | G06F 11/3684 714/38.1 |
| 7,000,247 B2 | 2/2006 | Banzhof | |
| 7,272,822 B1* | 9/2007 | Riggins | G06F 9/4443 714/38.14 |
| 7,818,788 B2 | 10/2010 | Meier | |
| 8,087,088 B1 | 12/2011 | Pennington et al. | |
| 2007/0186285 A1 | 8/2007 | Hurst et al. | |
| 2008/0263671 A1 | 10/2008 | Solino Testa et al. | |
| 2009/0138589 A1* | 5/2009 | Wunderlich | G06Q 30/02 709/224 |
| 2009/0327943 A1 | 12/2009 | Medvedev et al. | |
| 2010/0180193 A1 | 7/2010 | Jagdale et al. | |
| 2011/0099375 A1 | 4/2011 | Hammes et al. | |
| 2011/0173693 A1 | 7/2011 | Wysopal et al. | |
| 2011/0307940 A1 | 12/2011 | Wong | |
| 2013/0232474 A1* | 9/2013 | Leclair | G06F 9/44 717/134 |

OTHER PUBLICATIONS

Vinuesa et al. "A Dynamic Aspect Weaver over the .NET Platform", D.L. Hicks (Ed.): MIS 2003, LNCS 3002, pp. 197-212, 2004, Springer-Verlag Berlin Heidelberg 2004).*
Alshahwan et al., "Automated Web Application Testing Using Search Based Software Engineering", 2011, pp. 3-12.*

(Continued)

*Primary Examiner* — Thaddeus Plecha (57) ABSTRACT

Example embodiments disclosed herein relate to modifying execution of an application under test to act as if a user is a power user. The application under test is hosted in a real-time modifier. A security crawl is performed on the application under test logged in as the user. The user is treated as a power user.

20 Claims, 5 Drawing Sheets

(56) References Cited

OTHER PUBLICATIONS

"Application and Middleware Security", <http://users.encs.concordia.ca/-debbabi/pdf/application_middleware_security.pdf>, Nov. 23, 2006.

"Web Application Security",<Http://www.qualys.com/docs/qg_was_guide.pdf>, Feb. 2011.

Acunetix Software, Inc., "Is Your Website Hackable?", Acunetix Ltd., 2010; http://www.acunetix.com/vulnerability-scanner/wvabrochure.pdf, last accessed on May 31, 2011.

Acunetix, "Finding the Right Web Application Scanner: Why Black Box Scanning is Not Enough", http://www.acunetix.com/websitesecurity/finding-the-right-web-application-scanner.pdf, last accessed on May 31, 2011.

Auger, R; "Web Application Security Scanner Evaluation Criteria", <http://projects.webappsec. org/w/page/13246986/Web%20Application%20Security%20Scanner%Evaluation%20Criteria>, 2010.

International Search Report and Written Opinion received in related PCT Application No. PCT/US2011/038609, dated Feb. 9, 2012, 8 pages.

Iviz Security, "Application Penetration Testing", 2009-2013 iViZ Techno Solutions Pvt. Ltd; http://www.ivizsecurity.com/application-penetration.html; retrieved on Jun. 28, 2011.

Mediawiki OWASP Foundation, Testing for Incubated Vulnerability (OWASP-DV-015); https://www.owasp.org/index.php/Testing_for_Incubated_Vulnerability_(OWASP-DV-015); retrieved on Jun. 28, 2011.

Newsome, James, et al., "Dymanic Taint Analysis for Automatic Detection, Analysis, and Signature Generation of Exploits on Commodity Software", http://valgrind.org/docs/newsome2005.pdf; Proceedings of the 12th Network and Distributed System Secuity Symposium (NDSS '05), Feb. 2005.

* cited by examiner

MODIFY EXECUTION OF APPLICATION UNDER TEST SO USER IS POWER USER

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. In a black-box approach, the scanner does not have any insight into the internal workings of the AUT.

BRIEF DESCRIPTION OF THE DRAWINGS

The following detailed description references the drawings, wherein.

DETAILED DESCRIPTION

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT). A reason to use an application in production or an application that is going to be put into production for testing is that the company may desire to test the same code in a manner that modifications to the AUT are not allowed. Using an AUT that is going to be the application in production at a quality assurance stage ensures that the application used in production has been tested.

Many web applications have at least two roles, a regular user role and an administrator role. The administrator role usually comes with more privileges, for example, they may be able to add users, delete records, update web pages, etc. The administrator role can perform tasks that a regular user cannot. However, if these administrative functions or web pages are not securely protected, regular users would then be able to abuse these administrative functions to perform malicious actions.

A part of the testing the web application can include a test for unprotected, but privileged Uniform Resource Locators (URLs). This can use two scans, one of a first user as a logged in regular user and a second as a privileged user. Links found under the privileged account but not during the regular user account can be assumed to be protected resources and, therefore, should not be accessible to regular users. Thus, a differential analysis can be used to determine which of the links found should be considered privileged. However, this would use two sets of credentials (e.g., username and password), a regular user set, and an administrator set.

Accordingly, various embodiments described herein by using one credential for both scans with the aid of a Runtime Instrumentation Engine to emulate a super user. With the aid of the server agent, a web application scanner can find hidden pages or orphan pages. However these do not necessarily have to be restricted or privileged. Links that are found in administrator interfaces are more likely need to be restricted. Runtime instrumentation refers to the ability to modify the program code at runtime (or load time) for monitoring, tracing, debugging, or adding extra functionality to the original program code. Various frameworks offer various approaches to enabling this functionality. For example, the Microsoft .NET® framework can use the ICorProfilerCallback and ICorProfilerCallback2 interfaces to help enable such functionality. Other frameworks can include Java,™ WebObjects, web2py, etc. The engine can be in the form of a library or a dynamic-link library (DLL), and can be activated during an early stage of the program initialization to transform any other program code, classes, etc. that are loaded thereafter. The configuration file can instruct the engine as to what should be transformed, intercepted, or monitored. Runtime Instrumentation can also work with automated web application scanners and act as a server agent. For example, an instrumented web application can find vulnerabilities that may not be found by a scanner alone and can provide code level details such as stack traces or database query statements to the scanner as supplementary information.

In one example, "admin" only links can be determined by using the Runtime Instrumentation to bypass authorization checks. This can be referred to as "SuperUserMode." Then the differences of the outputs (e.g., Hypertext Markup Language (HTML) outputs) of a SuperUserMode run and a regular user run can be compared to perform differential analysis.

One example includes the following code:

```
<body>
<a href="home.aspx">Home</a>
<a href="contactus.aspx">Contact Us</a>
<% if (ifRole("admin") ) { %>
<a href="admin.aspx">Admin</a>
<% }%>
```

In this example, the ASPX page displays an extra "admin.aspx" link if the user has the "admin" role. We can use the Runtime Instrumentation to force the "isRole(admin)" to return true even though the user does not have the "admin"

role. As such, during a scan or crawl, the link will still be shown. By following the hidden link revealed in the page, other "admin" links may also be crawled. For example, the link, when followed may include a page that includes an "add user" link, a "delete user" link, an "add product" link, etc. Each of these links may also have additional links that may be considered administrator links that should be protected.

In some examples, for example, in the .NET framework, standard Authentication and Authorization frameworks can be used. The approaches for authorization checks being made can be monitored for each type of framework supported. In the example of .NET, authorization APIs can be modified/changed, such as:

System.Security.Principal.IPrincipal.IsInRole (String role) returns true in SuperUserMode. System.Web.Security.RoleProvider.IsUserInRole (String username, String rolename) returns true in SuperUserMode. System.Web.Security. RoleProvider.GetrolesForUser(String username) redirects call to GetAllroles ( ) in SuperUserMode. System.Web.Security.RoleProvider.GetUsersInRole (String rolename) adds current user to return in SuperUserMode.

In certain examples, an administrator is a special user account used for system administration. Examples of an administrator account may be a root account, an admin account, a supervisor account, etc. In some examples, an authorization flag may be associated to the administrator's account profile to determine whether administrative functions can be performed. In some examples, a power user is a user that has access to one or more administrative functions. As such, a power user can be a simulated manager with the privileges of that position, a simulated administrator with the privileges of that position, etc.

In one example, a web application is an application that is accessed over a network such as the Internet or an intranet. In certain examples, the web application can run on J2EE Application Server or be an ASP or ASP.NET web application. Moreover, in some examples, a web application scanner or scanner is a program that communicates with a web application through a front-end in order to identify potential security vulnerabilities in the web application and architectural weaknesses by performing tests.

Figure 1A:
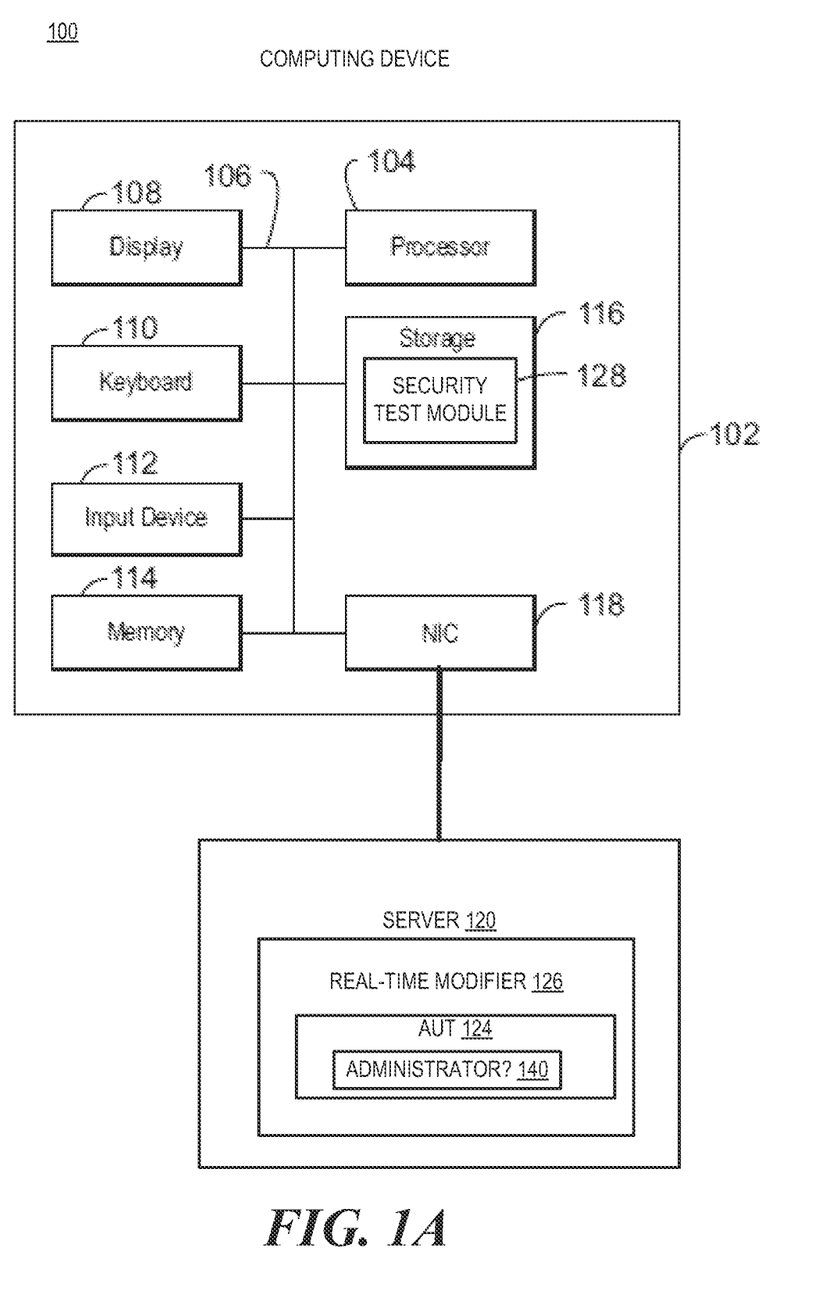
FIGS. 1A and 1B are block diagrams of computing systems capable of modifying execution of an application under test to act as if a user is a power user, according to various examples.
Figure 1B:
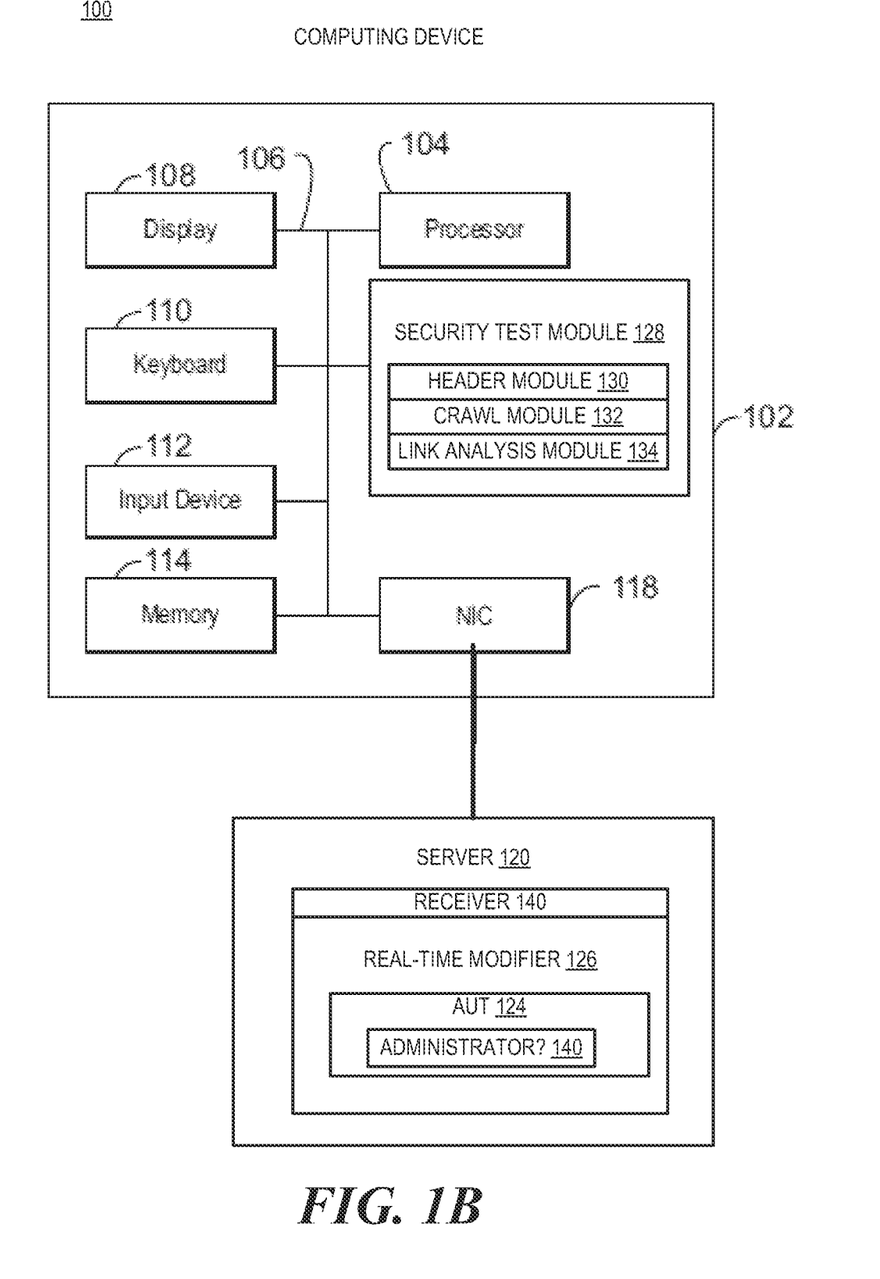

FIGS. 1A and 1B are block diagrams of computing systems capable of modifying execution of an application under test to act as if a user is a power user, according to various examples. The system is generally referred to by the reference number 100. Those of ordinary skill in the art will appreciate that the functional blocks and devices shown in FIG. 1A and FIG. 1B may comprise hardware elements including circuitry, software elements including computer code stored on a non-transitory, machine-readable medium, or a combination of both hardware and software elements. Further, the configuration is not limited to that shown in FIG. 1A or 1B, as any number of functional blocks and devices may be used in embodiments of the present invention. Those of ordinary skill in the art would readily be able to define specific functional blocks based on design considerations for a particular electronic device.

As illustrated in FIG. 1A, the system 100 may include a computing device 102, which can include a processor 104 connected through a bus 106 to a presentation device such as a display 108, a keyboard 110, and one or more input devices 112, such as a mouse, touch screen, or keyboard. In an embodiment, the computing device 102 is a general-purpose computing device, for example, a desktop computer, laptop computer, server, and the like. The computing device 102 can also have one or more types of non-transitory, computer readable media, such as a memory 114 that may be used during the execution of various operating programs, including operating programs used in embodiments of the present invention. The memory 114 may include read-only memory (ROM), random access memory (RAM), and the like. The computing device 102 can also include other non-transitory, computer-readable media, such as a storage system 116 for the long-term storage of operating programs and data, including the operating programs and data used in embodiments of the present invention.

In an embodiment, the computing device 102 includes a network interface controller (NIC) 118, for connecting the computing device 102 to a server 120. The computing device 102 may be communicatively coupled to the server 120 through a network, such as the internet, a local area network (LAN), a wide-area network (WAN), or another network configuration. The server 120 may have a non-transitory, computer-readable media, such as storage device, for storing data, buffering communications, and storing operating programs of the server 120. Communications between the computing device 102 and the server 120 may be conducted using a request-response protocol such as the Hyper-Text Transfer Protocol (HTTP) or another application programming interface (API).

The server 120 may be an application server that hosts an AUT 124. The server 120 also includes a real-time modifier 126 that can monitor and/or modify execution of the AUT 124. In certain examples, the real-time modifier 126 acts as an environment for the AUT 124 to execute. The real-time modifier 126 can be implemented using a software framework such as the .NET framework, the Java Virtual Machine, or other similar engines. In other examples, aspect oriented programming or other software may be used. In some examples, the server can be implemented as a computing device such as computing device 500, a laptop, a desktop computer, a workstation, or other computing device.

In one example, Java Virtual Machine instrumentation is used. An API Called Instrument can be used to monitor and/or manage APIs that are called. Here, when a particular API or set of APIs is called, the instrument can substitute code, variables, etc. into execution and/or otherwise modify the execution of the AUT 124. For example, if a part of the API is called, code associated with the real-time modifier can be executed to facilitate choosing of a desired path. Similar approaches can be used in other software frameworks such as .NET. Here, the changes can be performed in memory. As such, the AUT 124 need not be modified directly.

In another example, aspect oriented programming features may be used. APIs to be monitored can be specified. At runtime, changes can be implemented on the fly based on programmed settings. As such, the search for authorization checks can be customized based on framework and/or other known information.

The computing device 102 may include a security test module 128 such as a scanner, fuzzing, vulnerability tester, etc. that performs a security test against the AUT 124. In one example, a vulnerability tester looks for known vulnerabilities in an AUT 124 and reports potential exposures. In another example, a penetration tester or scanner is a test that looks for ways to exploit a normal course of business associated with the AUT 124. In yet another example, fuzz testing can be a technique that involves providing invalid, unexpected, or random data to inputs of an AUT. The AUT 124 can then be monitored for issues.

The security test module 128 may send HTTP requests to the AUT 124 through the network, wherein the HTTP request is configured to attempt to expose a vulnerability of the AUT 124. The HTTP requests may include HTTPS requests, which combine the Hypertext Transfer Protocol with the SSL (Secure Sockets Layer) and TLS (Transport Layer Security) protocols to provide encrypted communication and secure identification of a network Web server.

During the processing of the HTTP request by the AUT 124, an observer (not shown) can monitor the internal processes performed by the AUT 124. For example, the observer can identify lines of code that are executed by the AUT 124, files that are accessed, database queries that are performed, and the like. Both the observer and the AUT 124 may be configured to communicate with the security test module 128 over a same HTTP channel.

Figure 2:
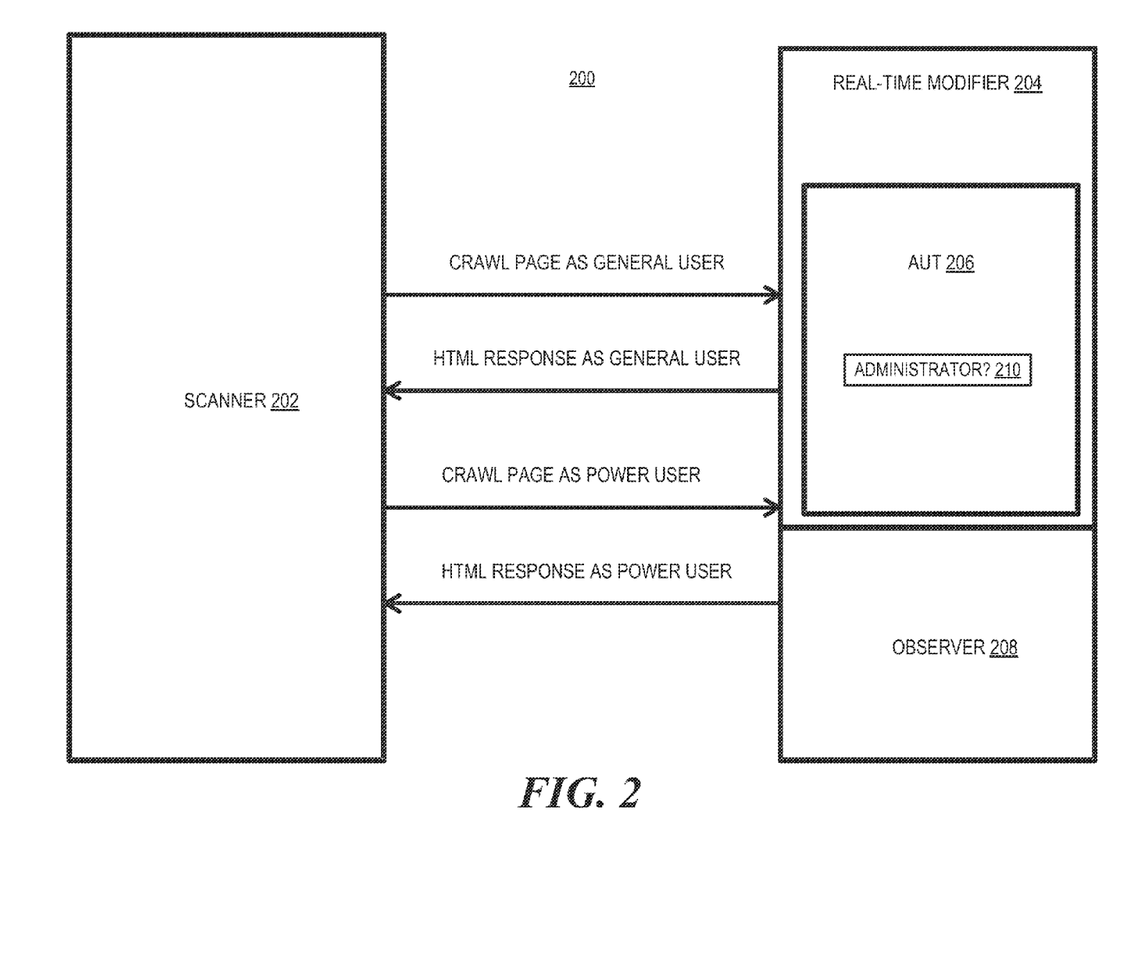
FIG. 2 is a block diagram of showing a testing system configuration capable of modifying execution of an application under test to act as if a user is a power user, according to one example.

As described further in reference to FIG. 2, some requests sent from the security test module 128 to the server 120 may target the AUT 124 to elicit a response from the AUT 124 in accordance with its programming. Other requests sent from the security test module 128 to the server 120 may target the observer to obtain additional information regarding the effect that a particular request had on the operations performed by the AUT 124 or other information related to the AUT 124, the observer, or the server 120 hosting the AUT 124. Data received by the security test module 128 in responses to application requests and service requests may be used by the security test module 128 to generate vulnerability reports. Vulnerability reports may be displayed to the user though a user interface provided by the security test module 128.

Communications can be directed at the AUT 124 using a login credential. In one example, a part of the AUT 124 can check to determine what data is associated with the credential, for example, whether the login is an administrator 140. In one example, the security test module 128 can be caused to perform a security crawl on the AUT logged in as a user. Two security crawls can be done, one with a power user active and one without the power user active.

A crawl module 132 performs the security crawls. During the security crawl without the power user active, communications can be sent back and forth between the server and computing device. This crawl can generate a set of links. These links can be associated with what a regular user can access.

A header module 130 can be used to generate and send a header to the server to cause the real-time modifier 126 to act as if the user is a power user. In one example, each communication can have the header. In another example, the header or another message can be sent to activate the mode and another can be sent to deactivate the mode. A receiver 140 can receive communications from the computing device 102. As such, the receiver 140 can receive the header. Once received, the real-time modifier is caused to act as if the user is a power user. As noted above, different links may be provided on parts (e.g., web pages) of the AUT 124 when the power user mode is active.

During the power user mode, during a security crawl, the real-time modifier modifies an execution, at runtime and/or at load time, of the AUT as if the user is a power user. In one example, this can occur by modifying function calls to check a role of the user as an administrator to return true. As such, if the AUT checks for whether the user is an administrator, the acts as if the user is an administrator. In another example, if the power user mode is active, function calls to retrieve users of a role additionally includes the current user. Moreover, in some examples, a function for a user authorization check can return information that the AUT 124 should treat the user as if the user is an administrator based on the real-time modifier. Example code to implement this functionality is provided above with respect to .NET authorization APIs. Other APIs can use approaches to accomplish an approach to treat the user as if the user is an administrator. In some examples, the converse can be true as well. For example, the real-time modifier 126 can take a user identifier that is set to have additional privileges (e.g., administrator privileges) and change the outcomes of one or more functions to make it seem to the AUT 124 that the user does not have these privileges.

In one example, an authorization check 140 returns information that the AUT 124 should treat the user as if the user is an administrator based on the real-time modifier 126. The AUT 124 can add one or more links to a web page based on the information that is returned. The one or more links can be part of a set of links associated with the power user mode. A link analysis module 134 can determine which of the regular user mode links is not available in the set of links found during the power user mode. In some examples, the regular user mode can include a subset of the power user mode links. In other examples, some of the links can be mutually exclusive. The links that are found during the power user mode crawl, but not during the regular user mode crawl can be considered links that should be protected.

As such, if the security test module 128 performs a security test, such as a scan on the AUT 124, it can test the links that are considered links that should be protected. If one or more of the links in the set that should be considered protected are found to work when a user is logged in as a regular user, it can be considered a security risk.

In some examples, parts of the AUT can be tested at a time. For example, one web page of the AUT can be crawled in regular user mode and then in the power user mode. Records can be kept of each crawl of the page. Further, links that are available to the administrator, but not the regular user can be considered protected. In another example, its protected status can be changed if a crawl of another page leads to the same link. Moreover, links found in the protected page can be considered protected as well.

FIG. 2 is a block diagram of showing a testing system configuration capable of modifying execution of an application under test to act as if a user is a power user, according to one example. The system 200 may include a scanner 202, a real-time modifier 204, an AUT 206, and an observer 208. The AUT 206 can make checks to see if administrator privileges should be allowed 210.

The AUT 206 may be encoded in any suitable Web-based computer language, such as JAVA, or .NET, among others. The AUT 206 may operate within an suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 206 may be configured to execute one or more instances of a Java Virtual Machine (JVM), Common Language Runtime (CLR), and/or other runtime environment for processing requests from the scanner 202. The programming instructions provided by the common code modules of the software framework or runtime environment may be referred to as container code. The custom programming instructions specific to the AUT 206 may be referred to as user code. During testing, a scanner 202 can explore the AUT 206 by making HTTP requests and evaluating the HTTP responses or the lack thereof in order to find all of the URLs where the AUT accepts input. Even though examples discussed herein are directed to a scanner 202, it is contemplated other security testing engines, modules, and/or techniques can be used. As shown in system 200, HTTP requests can be used to crawl one or more web pages of the AUT 206 as a general user and receive responses. Further, HTTP requests can be used to crawl one or more pages as a power user and receive responses. As noted above, a header or other message can be used to determine whether a super user mode is active.

The AUT 206 includes a network interface (not shown) for enabling communications between the scanner 202 and the AUT 206 through the network. The network interface exposes the attack surface of the AUT 206 and is the same interface that would eventually be used to provide access to the AUT 206 when the AUT 206 is made available for general use.

Communication between the scanner 202 and the AUT 206 over the network interface may be conducted through application (e.g., via HTTP) requests issued from the scanner 202 to the AUT 206 and HTTP responses issued from the AUT 206 to the scanner 202. Requests targeting the AUT 206 may be referred to as application requests, and responses received from the AUT 206 may be referred to as application responses. The application requests generated by the scanner 202 may be configured to expose potential vulnerabilities of the AUT 206, to respond to tests posed by the AUT 206, or the like.

The real-time modifier 204 and/or observer 208 can operate within the execution environment of the AUT 206 and has access to the internal operations performed by the AUT 206. For example, the real-time modifier 204 may modify the bytecode of the AUT 206 by injecting additional code, such as a JAVA class, at various program points. The injected code acts as a monitor that observes the AUT 206. The injected monitor code may be located at strategic program points in the AUT 206, for example, application programming interface (API) calls that perform specific operations, such as authorization checks 210 to determine whether administrator privileges should be invoked.

Communications between the scanner 202 and the observer 208 may be implemented through the use of custom request and response headers. Custom headers may be added to the application requests by the scanner 202, and custom headers may be added to the application responses by the observer 208. In this way, at least some of the communications between the scanner 202 and the observer 208 may be piggy-backed on normal communications with the AUT 206. Using a single channel of communication eliminates any problems with opening a dedicated, secondary channel, and adding HTTP headers typically does not interfere with the normal operation of the AUT 206.

The observer 208 may be used to provide information to the scanner 202 to facilitate testing of the AUT 206. The scanner 202 can communicate with the observer 208 by using service requests and responses. The service requests and responses can be implemented using, for example, custom headers.

With these approaches, a security crawl can be performed by the scanner 202 in which the AUT 206 is crawled as a general user to determine a set of links. Another security crawl can also be performed by the scanner 202 in which the AUT 206 is crawled as a power user to determine another set of links. A differential analysis can be performed on the two sets of links to determine which of the links should be considered protected. In one example, it can be assumed that links that are found in the power user mode, but not during the general user mode should be protected.

Then, the scanner 202 can perform a scan on the AUT 206. Thus, the scanner expects the AUT 206 to block access to protected links during the scan (e.g., because it is considered protected). Therefore, if there is no HTTP 500 (error or exception), a 401 (unauthorized), etc., the scanner 202 can consider the ability to access the link a vulnerability or insufficient authorization.

Figure 3:
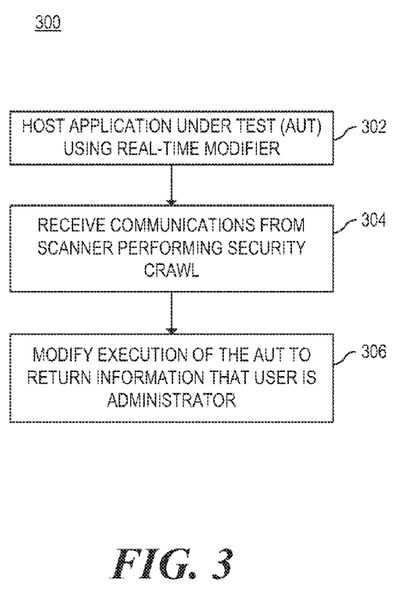
FIG. 3 is a flowchart of a method for modifying execution of an application under test to return information that a user is a power user, according to one example.

FIG. 3 is a flowchart of a method for modifying execution of an application under test to return information that a user is a power user, according to one example. Although execution of method 300 can be implemented using system 100, system 200, or other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry.

Method 300 may begin with an AUT executing in a real-time modifier on a computing device (302). The AUT can execute in a runtime environment based on one or more frameworks. For example, the AUT may execute on server 120 or computing device 500 as discussed herein. Communications can be sent from a security test module to perform a security crawl on the AUT. The security test, for example a scan from a scanner, can be logged in as a user. The user may not specifically have administrator privileges.

At 304, these communications are received from the scanner performing the security crawl on the AUT. The scanner can send one or more communications to the real-time modifier to enable modification of the AUT in real-time to treat the user, which can be a regular user or general user that does not have administrator privileges, as a user with administrator privileges. As such, a power user mode can be enabled. Communications of the security crawl can continue.

At 306, the execution of a function for user authorization check is modified to return information that the AUT should treat the user as if the user is a power user (e.g., has one or more or all administrator privileges). As noted, this can be based on the trigger to use the power user mode. This can be based on a single communication enabling the mode or the mode can be enabled for each communication. In some examples, what is returned or performed by the authorization check is changed from how it would normally treat the user to treat the user as an administrator.

In certain examples, a web page or each of the web pages of the AUT provide a first set of links including links from the security crawl. The first set of links can include links that would normally be found for a regular/general user as well as a second set of links that are included based on the return information. This can occur, for example, because the modified return information can cause additional links to be displayed on a web page(s) for users with one or more administrator privileges.

Figure 4:
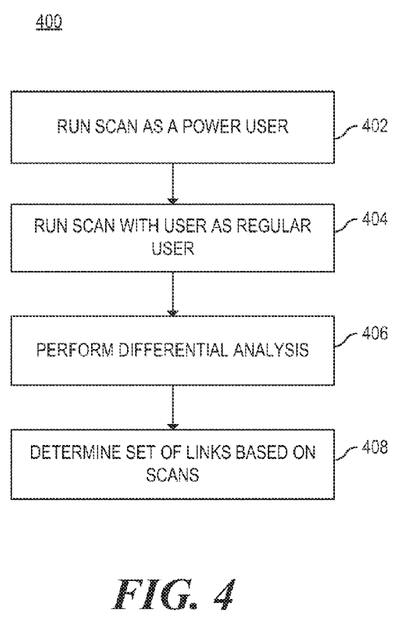
FIG. 4 is a flowchart of a method for generating links based on scans with user as a regular user and a user as a power user, according to one example.

FIG. 4 is a flowchart of a method for generating links based on scans with user as a regular user and a user as a power user, according to one example. As with method 300, at 402, a scan run as a power user can yield a first set of links from the security crawl. These links can include regular user links as well as administrator links. Further, the links can be associated with a single web page or many web pages of the AUT. In some examples, links found with the administrator privileges can be followed to find more links/web pages of links, which can be added to the set.

At 404, a security crawl can be performed as a regular or general user. In one example, the regular user is not flagged as an administrator (e.g., in one or more authorization checks). The AUT can receive a second set of communications associated with the second security crawl on the AUT. As noted, in this example, the user is logged in and the real-time modifier does not modify the execution of the AUT to make the user look like a power user to the AUT. During the crawl a third set of links can be generated. These links can include the links of a web page or multiple web pages of the AUT. In some examples, the security crawls can be run in different orders (e.g., the crawl at 404 may be executed before the crawl at 402). Further, the crawls can be executed in parts (e.g., portions of one crawl and then portions of another crawl).

At 406, a differential analysis can be performed on the first set of links and the third set of links. The differential analysis can be used to determine one or more of the second set of links (referred to as the third set of links) (408). The third set of links can be considered the links that should be protected out of the links available to the power user. When a full scan of the AUT is performed, if these links are accessible by regular users, it can be considered a security vulnerability.

In some examples, the process for the regular user mode can be replaced with a no user mode. In this mode, no user is logged in. Further, in some examples, the administrator privileges may be invoked with the no user logged in approach using a trigger.

Figure 5:
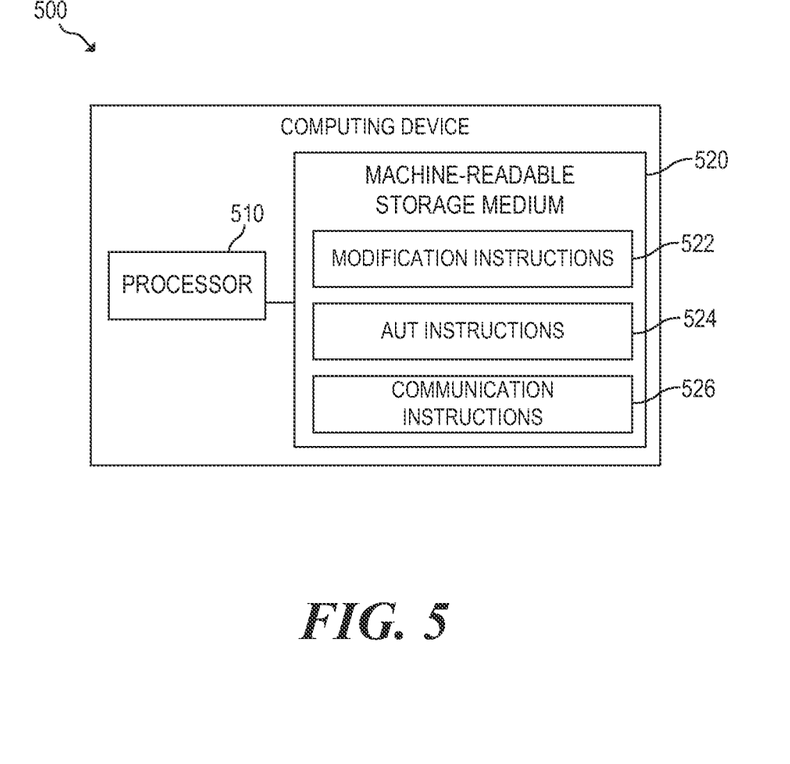
FIG. 5 is a block diagram of a computing device capable of modifying execution at runtime of an application under test to act as if a user is a power user based on a trigger, according to one example.

FIG. 5 is a block diagram of a computing device capable of modifying execution at runtime of an application under test to act as if a user is a power user based on a trigger, according to one example. The computing device 500 includes, for example, a processor 510, and a machine-readable storage medium 520 including instructions 522, 524, 526 for modifying execution, at runtime, of an AUT to act as if a user is a power user. As noted, this can be based on a trigger (e.g., a message or header). Computing device 500 may be, for example, a notebook computer, a slate computing device, a server, a desktop, a workstation, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement methods 300, 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for modifying execution at runtime of the AUT to act as if a user is a power user.

Modification instructions 522 can be used to implement a real-time modifier that can host an AUT. AUT instructions 524 can be executed to perform functionality of the application being tested. Communications instructions 526 can be used to receive communications from a scanner performing a security crawl on the AUT. During the test, the scanner can log in as a user. The user can be considered a regular or general user without administrator privileges. In one example, the modification instructions 522 are executed to modify an execution at runtime of the AUT to act as if the user is a power user. This can be based on a trigger as detailed above.

In one example, the execution of a function for a user authorization check is modified to return information that the AUT should treat the user as if the user is an administrator. As noted above, the return information could include adding the user when searching for a list of users with the administrator role or return true for a check on the username to see if the user is an administrator. A set of links can be added to a web page of the AUT based on the return information. As noted above, this can be because the AUT can be programmed to add one or more links to a page if the username logged in is an administrator. This can be used to add privileges to the administrators' accounts.

As noted above, a second set of communications associated with a second security crawl can also be received. In this second crawl, the AUT can be logged in as the user or another regular user without modification being triggered. Another set of links can be generated. As further detailed above, the links generated under the power user mode and the links generated in the regular user mode can be analyzed using differential analysis to determine a set of links that should be protected. A scan can be performed to determine vulnerabilities, including any vulnerabilities about whether the links that should be protected may have.

With these approaches, the system can find unprotected, but privileged URLs. Further, these approaches allow for a scanning that requires fewer user interactions (e.g., no need to enter administrator credentials) and fewer configurations.

What is claimed is:

1. A computing system comprising:
   a processor; and
   a non-transitory machine-readable storage medium storing instructions, the instructions executable by the processor to:
   execute a real-time modifier hosting an application under test;
   receive, via a network, a page request from a scanner performing a security crawl, wherein the scanner is logged in to the application under test using a non-administrator user credential; and
   responsive to the page request, perform a first page crawl and a second page crawl using the non-administrator user credential, wherein the first page crawl is based on non-administrator user privileges, and wherein the second page crawl is based on administrator user privileges;
   wherein the page request provides the administrator user privileges, and the real-time modifier is triggered to allow the scanner to perform the second page crawl based on the administrator user privileges.

2. The computing system of claim 1, wherein during the second page crawl, a function call to check whether a role of the scanner is an administrator role is returned true.

3. The computing system of claim 1, wherein during the second page crawl, a function call to retrieve users of an administrator role returns the scanner.

4. The computing system of claim 1, further comprising instructions to:
receive a header from the scanner, wherein the real-time modifier is caused to perform the first page crawl and the second page crawl responsive to the page request if the header is received.

5. The computing system of claim 1, wherein a function for user authorization check returns information that the application under test should treat the scanner as a user with an administrator user credential based on the real-time modifier.

6. The computing system of claim 1, wherein a first set of links is generated during the first page crawl, wherein the first set of links are associated with non-administrator user privileges.

7. The computing system of claim 6, wherein during the second page crawl, a second set of links is generated, wherein the second set of links are associated with administrator user privileges.

8. The computing system of claim 7, wherein the instructions are executable to determine which of the second set of links are not available in the first page crawl.

9. The computing system of claim 7, wherein the first set of links is a subset of the second set of links.

10. A non-transitory machine-readable storage medium storing instructions that, if executed by at least one processor of a device, cause the device to:
host an application under test executing in a real-time modifier;
receive, via a network, a page request from a scanner performing a security crawl on the application under test, wherein the scanner is logged in to the application using a non-administrator user credential; and
responsive to the page request, perform a first page crawl and a second page crawl using the non-administrator user credential, wherein the first page crawl is based on non-administrator user privileges, and wherein the second page crawl is based on administrator user privileges;
wherein the page request provides the administrator user privileges, and the real-time modifier is triggered to allow the scanner to perform the second page crawl based on the administrator user privileges.

11. The non-transitory machine-readable storage medium of claim 10, wherein a first set of links is generated during the first page crawl, wherein a second set of links is generated during the second page crawl, wherein the first set of links are associated with non-administrator user privileges, and wherein the second set of links are associated with administrator user privileges.

12. The non-transitory machine-readable storage medium of claim 11, further comprising instructions that, if executed by the at least one processor, cause the device to:
determine which of the second set of links are not available in the first page crawl.

13. The non-transitory machine-readable storage medium of claim 10, wherein during the second page crawl, a function call to check whether a role of the scanner is an administrator role is returned true.

14. The non-transitory machine-readable storage medium of claim 10, further comprising instructions that, if executed by the at least one processor, cause the device to:
receive a header from the scanner, wherein the first page crawl and the second page crawl are performed responsive to the page request upon a receipt of the header.

15. A method comprising:
hosting an application under test executing in a real-time modifier on a computing device;
receiving, via a network, a page request from a scanner performing a security crawl on the application under test, wherein the scanner is logged in to the application using a non-administrator user credential; and
in response to the page request, performing a first page crawl and a second page crawl using the non-administrator user credential, wherein the first page crawl is based on non-administrator user privileges, and wherein the second page crawl is based on administrator user privileges;
wherein the page request provides the administrator user privileges, and the real-time modifier is triggered to allow the scanner to perform the second page crawl based on the administrator user privileges.

16. The method of claim 15, wherein a first set of links is generated during the first page crawl, wherein a second set of links is generated during the second page crawl, wherein the first set of links are associated with non-administrator user privileges, and wherein the second set of links are associated with administrator user privileges.

17. The method of claim 16, further comprising:
determining which of the second set of links are not available in the first set of links.

18. The method of claim 15, wherein during the second page crawl, a function call to check whether a role of the scanner is an administrator role is returned true.

19. The method of claim 15, wherein during the second page crawl, a function call to retrieve users of an administrator role returns the scanner.

20. The method of claim 15, further comprising:
receiving a header from the scanner, wherein the first page crawl and the second page crawl are performed responsive to the page request upon a receipt of the header.

* * * * *